(12) United States Patent
Takeuchi

(10) Patent No.: US 9,499,274 B2
(45) Date of Patent: Nov. 22, 2016

(54) AIRCRAFT PYLON AND AIRCRAFT

(71) Applicant: Mitsubishi Aircraft Corporation, Aichi (JP)

(72) Inventor: Akira Takeuchi, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 414 days.

(21) Appl. No.: 14/162,044

(22) Filed: Jan. 23, 2014

(65) Prior Publication Data

US 2015/0048201 A1    Feb. 19, 2015

(30) Foreign Application Priority Data

Jan. 25, 2013    (JP) .................................. 2013-011746

(51) Int. Cl.
  *B64C 27/26*    (2006.01)
  *B64D 27/26*    (2006.01)
  *B64D 27/18*    (2006.01)

(52) U.S. Cl.
  CPC .............. *B64D 27/26* (2013.01); *B64D 27/18* (2013.01); *B64D 2027/266* (2013.01); *B64D 2027/268* (2013.01); *Y02T 50/44* (2013.01)

(58) Field of Classification Search
  CPC .......................... B64C 27/26; B64C 2027/266
  See application file for complete search history.

(56) References Cited

U.S. PATENT DOCUMENTS

| 2005/0082423 A1* | 4/2005 | Whitmer | B64D 27/18 244/54 |
| 2010/0090056 A1* | 4/2010 | Gardes | B64D 27/26 244/54 |

FOREIGN PATENT DOCUMENTS

JP    2011-116186 A    6/2011

* cited by examiner

*Primary Examiner* — Nicholas McFall
(74) *Attorney, Agent, or Firm* — Pearne & Gordon LLP

(57) ABSTRACT

To provide an aircraft pylon capable of being mounted to a wing without exertion of preload while ensuring that redundancy is provided in the pylon. An aircraft pylon 50 includes: a pylon strut 11 for supporting an engine of an aircraft; a pin joint mechanism for connecting the pylon strut 11 to a main wing of the aircraft; a link member 15 disposed between the pylon strut 11 and the main wing of the aircraft, wherein the link member 15 includes a collection of plural independent link elements.

12 Claims, 4 Drawing Sheets

-- Prior Art --

AIRCRAFT PYLON AND AIRCRAFT

BACKGROUND OF THE INVENTION

1. Field of the Invention

The present invention relates to an aircraft pylon.

2. Description of the Related Art

An engine of an aircraft is mounted to a wing via a pylon comprising a structural member called a pylon strut (see, for example, Japanese Patent Laid-Open No. 2011-116186.).

As shown in FIG. 4, a pylon strut 110 which constitutes a pylon 500 is provided on an undersurface of a wing 100 so as to extend toward a front in a flying direction. In an engine 200, a fan section 200a at the front is mounted to an undersurface of the pylon strut 110 by a front engine mount 300, and a core section 200b at the rear is mounted to the undersurface of the pylon strut 110 by a rear engine mount 400.

As described above, the pylon 500 is an element connecting the engine 200 to the wing 100. Thus, redundancy is provided in a mounting structure between the pylon strut 110 and the wing 100 to ensure safety. That is, the pylon strut 110 is pin jointed at an attachment point 111, which is a reference point, to the wing 100. The pylon strut 110 is also pin jointed with a first link 113 and a second link 115 to the wing 100. The first link 113 is pin jointed at an attachment point 113a to the pylon strut 110, and is pin jointed at an attachment point 113b to the wing 100. The second link 115 is pin jointed at an attachment point 115a to the pylon strut 110, and is pin jointed at an attachment point 115b to the wing 100.

Thus, in the conventional pylon 500, redundancy is ensured by connecting the pylon strut 110 to the wing 100 by the pin joint at the attachment point 111 and the two links (first and second links).

Though FIG. 4 shows that the wing 100 is directly connected to the first link 113 or the like for the sake of clarity, such connections are normally made with fittings.

SUMMARY OF THE INVENTION

As described above, the pylon strut 110 is supported on the wing 100 in cantilever fashion, and is constrained to the wing by the pin joint at the attachment point 111 and the first link 113. That is, there is a case where the second link 115 is hardly mounted to the wing 100 because the second link 115 makes no contribution to constrain the pylon strut 110, and assembly tolerances are accumulated at the attachment point 115b (or 115a) for the second link 115, which point is more distant than the attachment point 111, which is a reference point. In such a case, forces are exerted on the pylon strut 110 so as to intentionally cause elastic deformation (hereinafter referred to as "preload"), so that the positional displacement caused due to the accumulated assembly tolerances is absorbed.

The load exerted on the pylon strut 110 as a preload is determined based on the rigidity and size of the pylon strut 110. However, the excessively larger load may be caused when preloaded. In such a case, a tool required for the preload operation is expensive one having a high rigidity, and the preload operation requires higher levels of exertion.

The present invention was made in view of such a problem, and has an object to provide an aircraft pylon capable of being mounted to a wing without exertion of preload while ensuring that redundancy is provided in the pylon.

In the present invention, the attachment between the pylon strut and the wing is restricted to a single link other than the attachment reference point. However, in this case, the necessary redundancy is not provided unless any other measure is taken. Thus, the present invention proposes that redundancy is provided in a linked attachment structure.

That is, an aircraft pylon of the present invention includes: a pylon strut for supporting an engine of an aircraft; a pin joint mechanism for connecting the pylon strut to a main wing of the aircraft; a link member disposed between the pylon strut and the main wing of the aircraft, wherein the link member includes a collection of plural independent link elements.

In the present invention, the position of the pin joint mechanism may be a reference position to which the pylon strut is mounted.

As used in the present invention, the expression "independent" refers to being independent as a link element. Thus, the "plural independent link elements" of the present invention encompasses cases, for example, where two section steel members used as independent link elements are fastened together by a fastener (bolt and nut).

This means the link member of the present invention includes at least two embodiments. In the first embodiment, the plural link elements are not fastened together, and the respective link elements are separately disposed between the pylon strut and the main wing. In the second embodiment, the plural link elements are fastened together.

In the latter embodiment, since the plural link elements are fastened into one, the workload in disposing the link elements between the pylon strut and the wing is reduced compared with the case where the respective link elements are separately disposed therebetween. Moreover, even if one of the link elements is damaged and broken, it is free from the risk of falling off from the disposed position as it is fastened to other link elements.

Preferably, in the link member of the present invention, each link element is pin jointed at attachment points to the pylon strut and the main wing, respectively as this provides redundancy in attachment points.

In the pylon of the present invention, in connecting the pin joint mechanism and the link member to the main wing, respectively, the pin joint mechanism and the link member are desirably connected to a common fitting mounted on the main wing. This reduces the amount of accumulated assembly tolerances and the workload in mounting fittings on the wing.

In the pylon of the present invention, the link member is preferably provided above where the pin joint mechanism is connected to the main wing.

This configuration provides a broaden space at the rear of the pylon, thereby facilitating various operations such as assembling, maintenance, and the like.

According to the present invention, an aircraft including the above-described pylon is provided wherein the link member includes a collection of plural independent link elements.

In a pylon according to the present invention, the attachment between the pylon strut and the wing is restricted to a single link other than the attachment reference point, thereby resulting in the reduced accumulated tolerances compared to cases where two links are used. In addition, the use of a single link facilitates locating an attachment point close to the attachment reference point. Furthermore, in a pylon according to the present invention, the link member which includes a collection of plural independent link elements provides redundancy in the mounting structure.

DETAILED DESCRIPTION OF THE PREFERRED EMBODIMENTS

Hereinafter, a pylon in accordance with a preferred embodiment of the present invention will be described with reference to the accompanying drawings. In the following description, "front" and "rear" are determined based on a flying direction of an aircraft.

Figure 1:
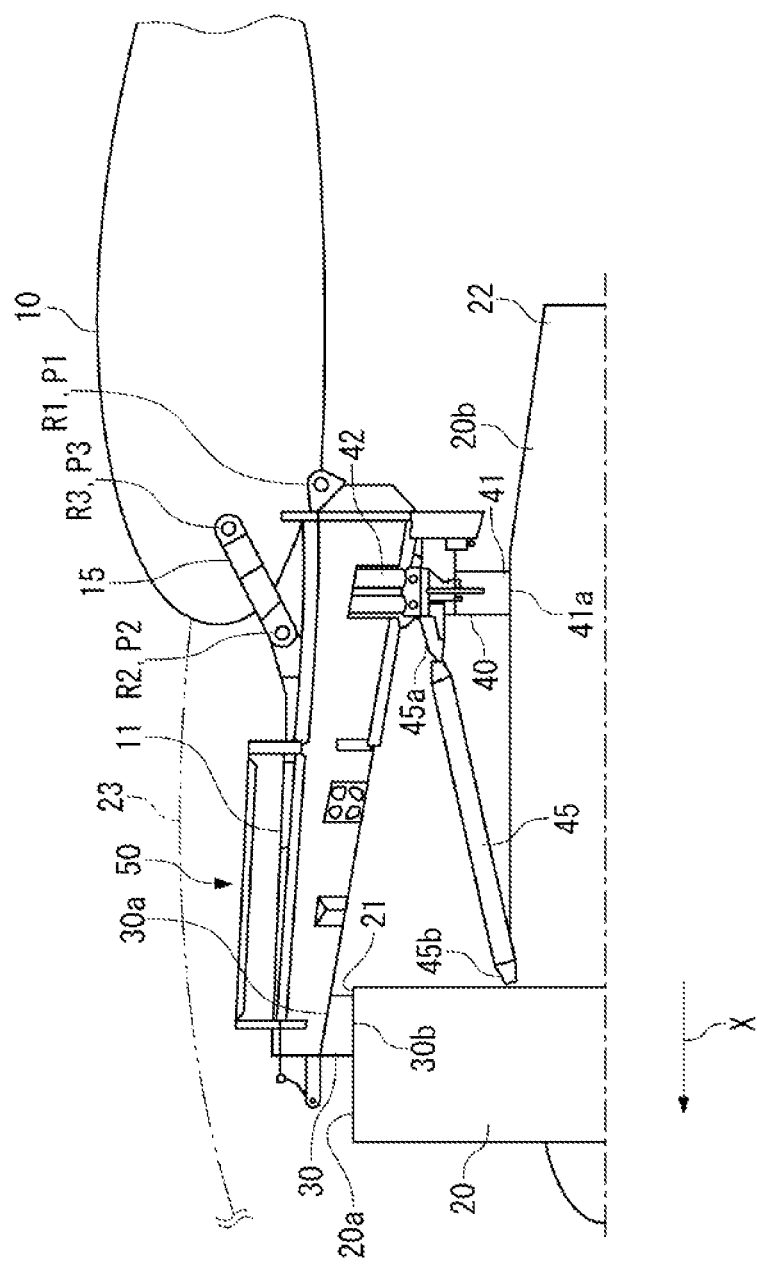
FIG. 1 is a schematic diagram illustrating a mounting structure between a pylon and a wing in accordance with an embodiment of the present invention.

As shown in FIG. 1, a pylon 50 of the present embodiment is provided on a wing 10 of an aircraft, supporting a turbofan type engine 20.

The pylon 50 is configured to include a pylon strut 11, a link member 15, and a connecting fastener P1. The pylon strut 11 is provided at an undersurface of the wing 10 to extend toward a front X in a flying direction (see FIG. 1.). The shape of the pylon strut 11 in a section orthogonal to a longitudinal direction is trapezoidal and its sectional area gradually reduces toward the front side from the rear side.

The engine 20 includes a fan section 20a provided at the front X in the flying direction, and an engine core section 20b provided at the rear of the fan section 20a. The fan section 20a is provided with a fan incorporated inside a shroud 21 circular in section. The engine core section 20b is accommodated in a housing 22 in a cylindrical shape with a diameter smaller than that of the fan section 20a, and includes a mechanism for driving the fan.

In the engine 20, the fan section 20a is mounted to the undersurface of the pylon strut 11 by a front engine mount 30, and the engine core section 20b is mounted to the undersurface of the pylon strut 11 by a rear engine mount 40.

The engine 20 and the pylon strut 11 are housed in a pylon fairing (not shown) and a nacelle 23.

The front engine mount 30 includes a top surface 30a and an undersurface 30b, which are fixed to the undersurface of the pylon strut 11 and the shroud 21 of the fan section 20a of the engine 20, respectively, by connecting means such as bolts.

The rear engine mount 40 is formed of an engine side mount member 41 fixed to the engine 20 side, and a strut side mount member 42 fixed to the pylon strut 11 side.

Here, the engine side mount member 41 has an undersurface 41a fixed to the top surface of the housing 22 of the engine core section 20b of the engine 20 by connecting means such as bolts.

Furthermore, one end 45a of a reinforcing rod 45 is connected to an upper portion of the engine side mount member 41. The reinforcing rod 45 has the other end 45b connected to the vicinity of a connecting portion of the engine core section 20b and the fan section 20a of the engine 20. This allows the reinforcing rod 45 to reinforce support for the front side of the engine 20.

The pylon strut 11 is pin jointed at an attachment point R1, which is a reference point, to the wing 10 by a connecting fastener P1 (pin joint mechanism). The attachment points R1 and the respective connecting fasteners P1 may be provided at opposing ends in the width direction of the pylon strut 11. The same applies to attachment points R2 and R3. The pylon strut 11 is pin jointed at the attachment points R2 and R3, respectively, to the wing 10 by the link members 15. Accordingly, the pylon strut 11 is supported by the wing 10.

More specific attachment structures are shown in FIGS. 2, 3A, 3B and 3C.

Figure 2:
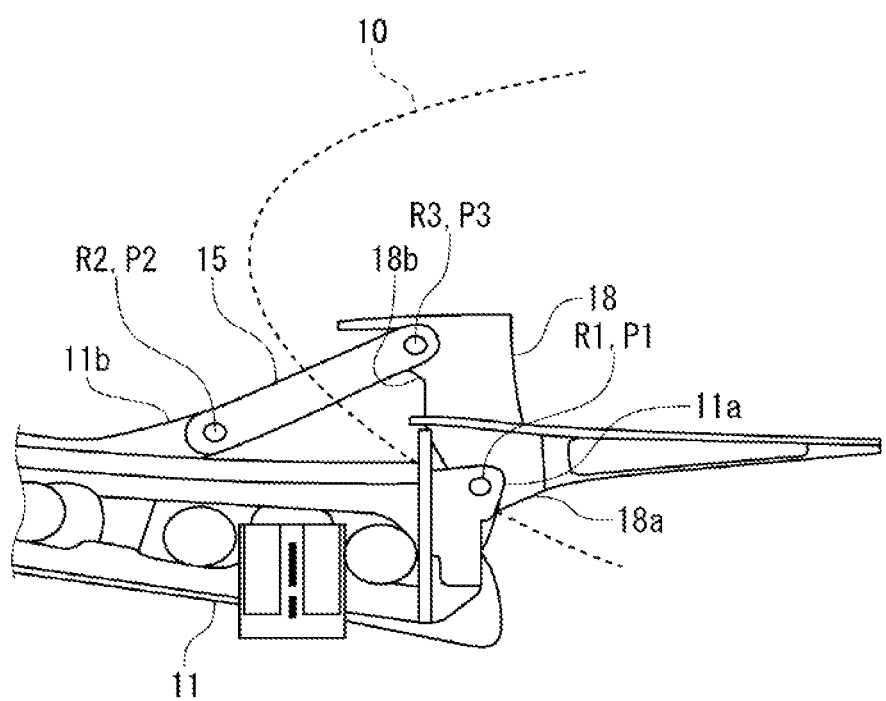
FIG. 2 is a schematic diagram illustrating details of the mounting structure between the pylon and the wing in accordance with the embodiment of the present invention.
Figure 3A:
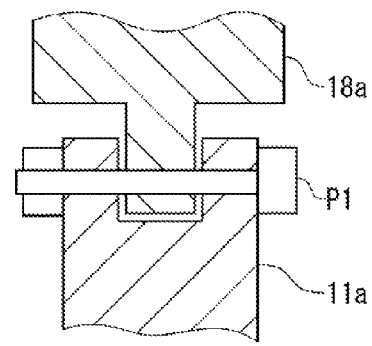
FIGS. 3A, 3B and 3C are diagrams illustrating details of attachment points of the present embodiment.

As shown in FIGS. 2 and 3A, at the attachment point R1, a connecting piece 11a of the pylon strut 11 side is pin jointed to a connecting piece 18a of a fitting 18 side of the wing 10 by the connecting fastener P1.

Figure 3B:
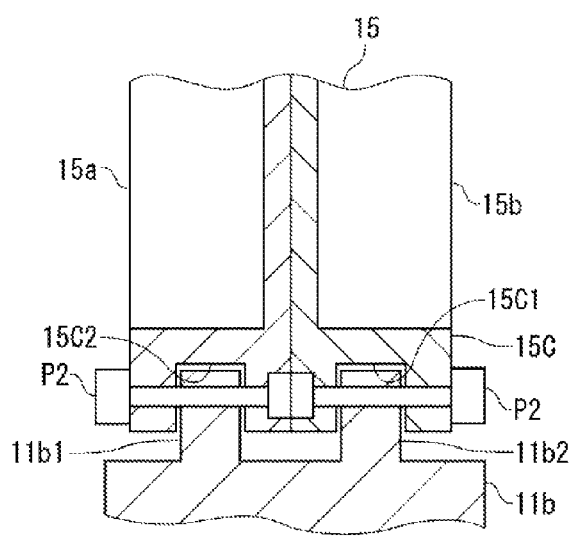
Figure 3C:
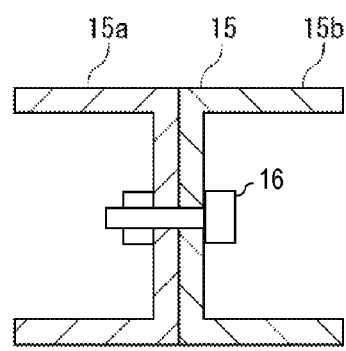

As shown in FIGS. 2, 3B, and 3C, at the attachment point R2, a connecting piece 11b of the pylon strut 11 side is joined to a connecting piece 15c of the link member 15 by the fastener P2.

As shown in FIGS. 3B and 3C, the link member 15 includes two channel steels 15a and 15b; and connecting pieces 15c provided at ends of the channel steels 15a and 15b, respectively. The two channel steels 15a and 15b are attached back-to-back at their webs and secured together with a fastener 16 such as bolt and nut or the like. The connecting piece 15c defines two recesses 15c1 and 15c2.

Also, the connecting piece 11b is provided with two connecting projections 11b1 and 11b2. These connecting projections 11b1 and 11b2 are arranged in the recesses 15c1 and 15c2, respectively, so that the connecting piece 11b is connected by the connecting fastener P2 to the corresponding connecting piece 15c in an interdigitated state. The respective fasteners P2 may be provided for the channel steels 15a and 15b, each fastener for a corresponding link element.

Alternatively, the connecting piece 11b defines the recesses while the link member 15 is provided with connecting projections.

An attachment structure between the fitting 18 and the link member 15 at the attachment point R3 is generally similar to the connecting structure between the pylon strut 11 and the link member 15 as described above, that is, a connecting piece 18b of the fitting 18 is pin jointed to the link member 15 by a fastener P3.

Figure 4:
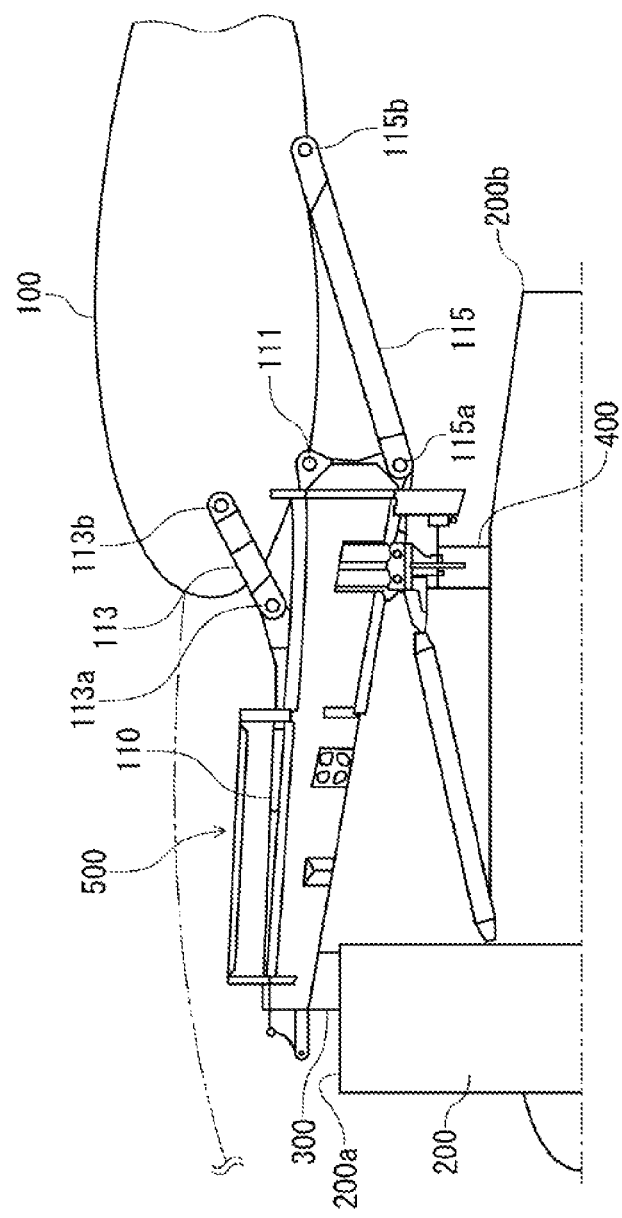
FIG. 4 is a schematic diagram illustrating a mounting structure between a pylon and a wing of the prior art.

In the present embodiment, the three attachment points R1, R2, and R3 are provided, and the attachment points R2 and R3 associated with the link member 15 are closed to the attachment point R1 in the attachment. In the conventional mounting structure as shown in FIG. 4, the attachment point 111 as a reference point (corresponding to the attachment point R1) and the attachment points 115a and 115b are provided, and particularly the attachment point 115b is far from the attachment point 111. Therefore, in the present embodiment, the amount of accumulated tolerances is reduced compared to the conventional mounting structure of FIG. 4, thereby eliminating the need to exert any preload when attaching the pylon strut 11. In the present embodiment, the fitting 18 has two attachment positions, i.e., the attachment points R1 and R3 (corresponding to the attachment points 111 and 113b, respectively, in the conventional structure), which clearly indicates the fact that the attachment points R2 and R3 are close to the attachment point R1.

The structure of the present embodiment eliminates the need of the second link 115 of the conventional structure as shown in FIG. 4 and a fitting disposed between the second link 115 and the wing 100, thereby reducing the weight of an aircraft and decreasing parts count which leads to a reduction of production costs. In addition to the elimination of these parts, the attachment point R3 is provided higher than the attachment point R1 and the link member 15 is disposed above the connecting piece 11a, thereby providing a new space and improving rigging allowances for loading rigs in the fairing at the rear portion of the pylon 50 or the like.

The structure of the link member 15 ensures the redundancy in the mounting structure between the pylon strut 11 and the wing 10.

That is, as the link member 15 includes two link elements (channel steels 15a and 15b), even if one of the link elements is damaged, the other undamaged link element maintains the state of the attachment between the pylon strut 11 and the wing 10. Though an H-section steel can be used to form a link member similar to the link member 15, the use of an H-section steel as a one-piece member does not ensure redundancy. In addition, the two link elements are joined to the pylon strut 11 by the respective independent connecting fasteners P2 (FIG. 3B). Thus, even if one of the fasteners is damaged, the other undamaged fastener maintains the state of the attachment between the pylon strut 11 and the wing 10.

The mounting structure of the present embodiment adopts a fail-safe design structure, and thus ensures redundancy without the second link 115 used in the conventional structure, as described above.

The present invention has been described in the embodiments thereof, but is not limited to the above embodiments.

For example, the link member 15 is constituted by channel steels 15a and 15b fastened together, but they may be separately disposed between the pylon strut 11 and the wing 10 without being fastened together. However, the use of channel steels fastened into one in such a manner as the link member 15 of the present embodiment results in a reduced workload in disposing the link member between the pylon strut 11 and the wing 10. For example, in the case of the link member 15 in an integrated form, through-holes for insertion of connecting fastener P2 can be simultaneously formed in the channel steels 15a and 15b without any registration error of the through-holes which would be caused in the case of individually forming respective through-holes in the channel steels 15a and 15b, thereby reducing the amount of accumulated assembly tolerances. Moreover, even if one channel steel, 15a, is damaged and broken, it is free from the risk of falling off from the disposed position as it is fastened to the other channel steel 15b.

Although, in the above-described embodiments, the pin joint at the attachment point R1 and the pin joint to the wing 10 side by the link member 15 are connected to the common fitting 18 mounted on the wing, the present invention allows for connection made to respective separate fittings. However, the connection to the common fitting is preferable as it reduces the amount of accumulated tolerances and the workload in mounting fittings on the wing.

Although, in the above embodiment, an example is shown in which a link member is constituted by channel steels, members for constituting the link member are not only channel steels, but also other shaped members such as H-section steel and angle steels to be combined to form a link member. The link member is formed of materials other than steel, such as carbon fiber composite material.

Other than this, the configurations cited in the above described embodiments can be selected or omitted, or can be arbitrarily changed to the other configurations, without departing from the gist of the present invention.

What is claimed is:

1. An aircraft pylon comprising:
a pylon strut for supporting an engine of an aircraft;
a pin joint mechanism for connecting the pylon strut to a main wing of the aircraft; and
a link member disposed between the pylon strut and the main wing of the aircraft, wherein the link member comprises a collection of plural independent link elements,
wherein the plural independent link elements are separately attached to the pylon strut, and
the plural independent link elements are attached to each other and partly butted against each other.

2. The aircraft pylon according to claim 1, wherein the plural independent link elements are fastened together.

3. The aircraft pylon according to claim 1, wherein the link member comprises the plural independent link elements each being pin jointed to the pylon strut and the main wing.

4. The aircraft pylon according to claim 1, wherein, in connecting the pin joint mechanism and the link member to the main wing, respectively, the pin joint mechanism and the link member are connected to a common fitting provided on the main wing.

5. The aircraft pylon according to claim 1, wherein the link member is provided above the pin joint mechanism.

6. The aircraft pylon according to claim 1, wherein the position of the pin joint mechanism is a reference position to which the pylon strut is mounted.

7. The aircraft pylon according to claim 1, wherein
the plural independent link elements are each attached to the pylon strut with a separate fastener, and
the plural independent link elements are attached adjacent to each other with another fastener.

8. The aircraft pylon according to claim 1, wherein the plural independent link elements are channel steels.

9. The aircraft pylon according to claim 1, wherein the link member includes a connecting piece provided at an end of each of the plural independent link elements.

10. The aircraft pylon according to claim 9, wherein the connecting piece defines a plurality of recesses.

11. The aircraft pylon according to claim 10, wherein the pylon strut further includes a plurality of projections at an end thereof that are arranged in the plurality of recesses, respectively, and are each pin-jointed to a corresponding one of the plural independent link elements by its associated separate fastener.

12. An aircraft comprising a pylon, wherein the pylon comprises:
a pylon strut for supporting an engine;
a pin joint mechanism for connecting the pylon strut to a main wing of the aircraft; and
a link member disposed between the pylon strut and the main wing of the aircraft, wherein the link member comprises a collection of plural independent link elements,
wherein the plural independent link elements are separately attached to the pylon strut, and
the plural independent link elements are attached to each other and partly butted against each other.

* * * * *